United States Patent [19]

Christiansen et al.

[11] 4,316,485
[45] Feb. 23, 1982

[54] SINGLE HANDLE MIXING VALVE WITH IMPROVED SEAT

[75] Inventors: Gerald E. Christiansen; William E. Politz, both of Flora, Ind.

[73] Assignee: Stephen A. Young Corporation, Flora, Ind.

[21] Appl. No.: 49,197

[22] Filed: Jun. 18, 1979

[51] Int. Cl.³ .............................................. F16K 7/12
[52] U.S. Cl. ................................ 137/625.4; 137/119; 251/360
[58] Field of Search ............... 137/119, 625.4, 625.41; 251/360, 363

[56] References Cited

U.S. PATENT DOCUMENTS

| | | | |
|---|---|---|---|
| 3,056,418 | 10/1962 | Adams | 137/119 |
| 3,471,872 | 10/1969 | Symmons | 137/119 X |
| 3,519,017 | 7/1970 | Nogier | 137/625.4 |
| 3,653,406 | 4/1972 | Racki | 251/363 X |
| 3,809,124 | 5/1974 | Nelson | 137/625.41 |
| 3,875,960 | 4/1975 | Miller | 137/119 |
| 4,182,372 | 1/1980 | Grandin | 137/625.4 |

Primary Examiner—Robert G. Nilson
Attorney, Agent, or Firm—Olsen and Stephenson

[57] ABSTRACT

There is disclosed a mixing valve primarily for hot and cold water which includes a complex unitary removable seat unit formed by molding, to cooperate with a control member and seal of special form to control fluid flow into a valve body and through the same to a bypass valve in the body which includes a spool arranged to operate in a horizontal position to cause fluid directed thereto, to be delivered to and from one outlet or another in response to opening and closing of one outlet.

1 Claim, 15 Drawing Figures

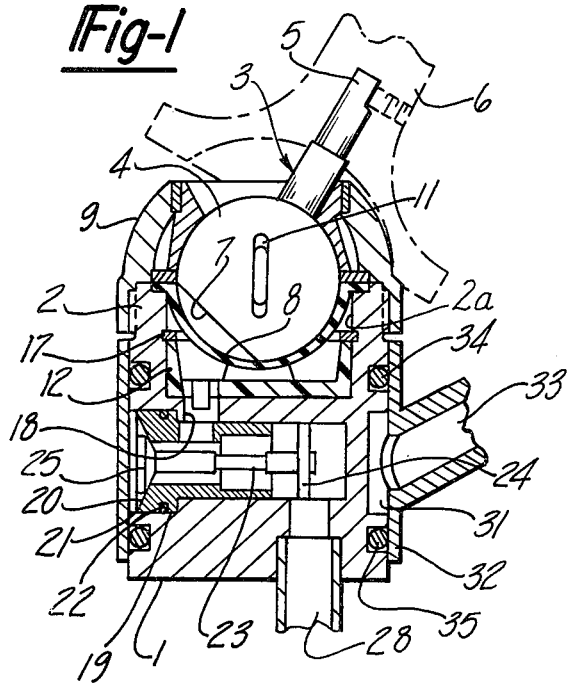
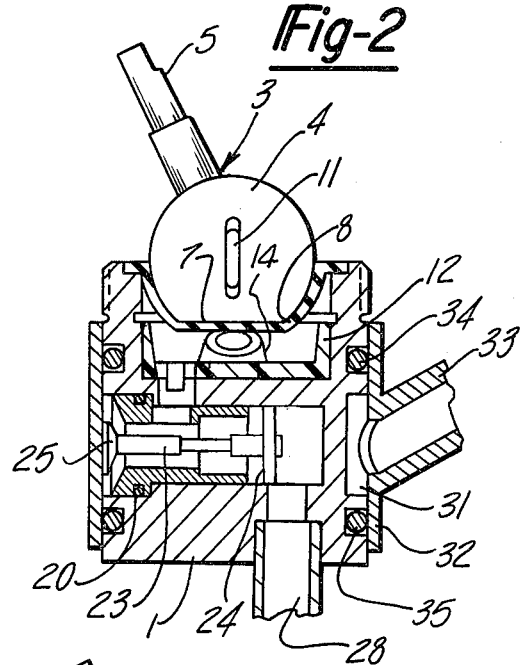
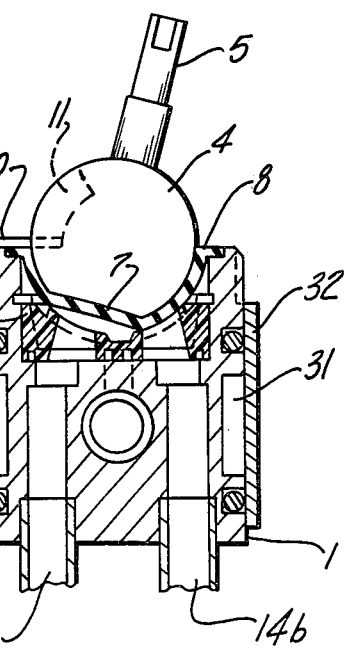
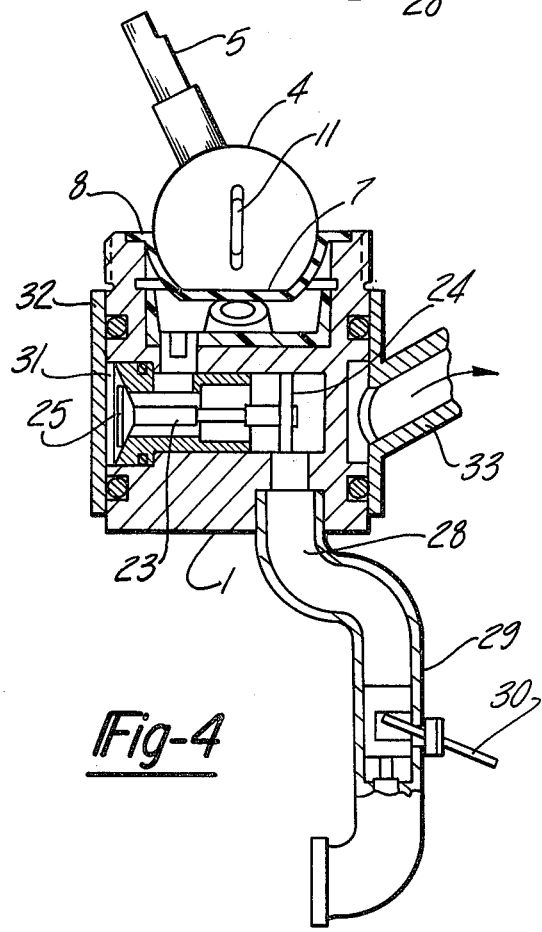

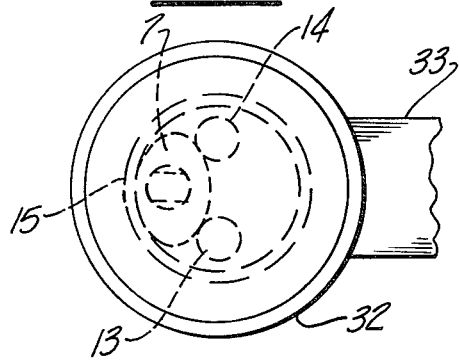
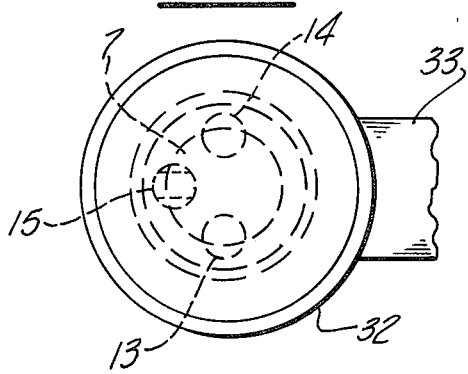
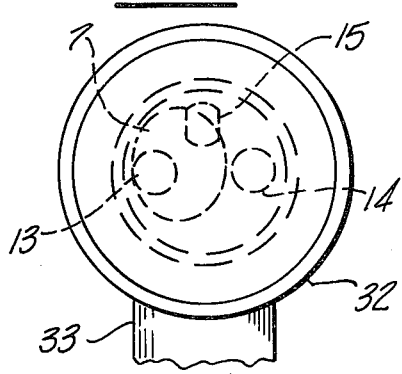
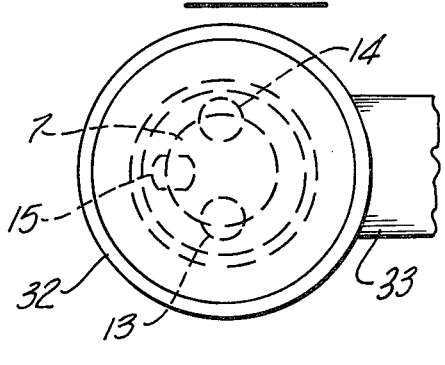
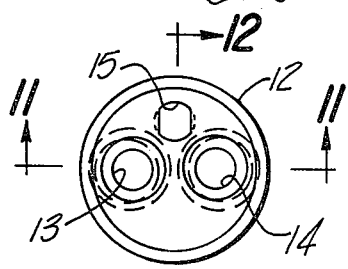
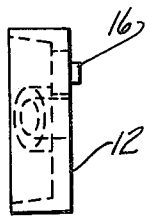
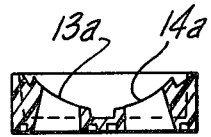
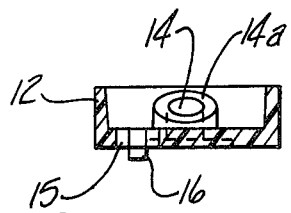
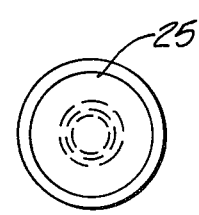
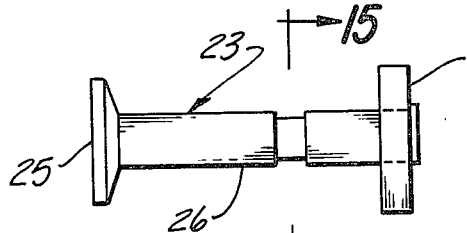
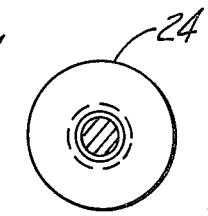

SINGLE HANDLE MIXING VALVE WITH IMPROVED SEAT

BACKGROUND AND PRIOR ART

This invention is directed to the aspect of mixing valves which are primarily used for domestic water control purposes and specifically in the sink faucets involved therein, and even more directly to sink faucets which include a spray attachment therefore.

Even more specifically the general area of consideration is the so-called "single lever faucet" art, wherein a faucet construction is provided involving a lever which is manipulated in such a manner as not only to open and close or permit the entrance of and exit of fluid through a valve, but also the tempering of water as by the admission of hot and cold water in any preferred proportion with a simple movement and without the necessity to operate two or more valves for that purpose.

With that general understanding therefore, it is recognized that sink faucets of this general class have long been known and even certain elements of the specific faucet here involved may also and have been used in somewhat different forms and with less satisfactory results, the instant sink faucet involving a single lever unit which incorporates a part which operates in conjunction with a seat which is of relatively complex nature.

In the prior art the use of a valve member which can be manipulated fore and aft and to the right and left for the respective aspects of mixing and admission of water and delivery therefrom, which involves even a diaphragm and other aspects, the usual problems arising in the seating and shutting off of water after long periods of use which cause deterioration of certain of the elements. This valve is an improvement and is definitely simpler in construction and manufacture in any event.

Another aspect of the prior art is that the shapes and forms necessary to be adapted are constricting with regard to the overall appearance which is improved hereby to facilitate the sales and other appeal of the particular article.

DESCRIPTION OF THE INVENTION

With the foregoing in mind the invention hereof is specifically directed to a single lever faucet with a by-pass construction, which single lever faucet incorporates therein a member of spherical form having a flattened portion, which in conjunction with a diaphragm pressed into engagement with and relieved from the entrances and exits of certain passages, thereby regulates the flow of water both hot and cold, into the interior of the valve and directs the said mixed fluid therefrom into a by-pass member or to the spout which is provided and which is a swinging device and necessarily must deliver the fluid in various areas in accordance with the movement of such spout.

The by-pass valve is intended to be operated upon actuation of an outlet connected to a spray mechanism, and operation of this spray mechanism in turn shuts off the flow of water through the spout in accordance with desired practice, the improvement residing in the shape of certain parts and their ability to be manufactured in relatively simple manner, with the by-pass valve in turn being arranged in a specially suitable way to change the profile of the faucet and thus facilitate the improvement in appearance and actually in ultimate operation in use.

With this premise, the principal object of the invention is to provide an improved single lever valve of the sink faucet environment type, which incorporates a control member movable in the necessary directions to control the flow and to temper the mixture in accordance with desired results whether it be from the water delivered to the spout or from the spray attached thereto.

In view of the foregoing, the environment and objects of the invention will be readily understood and are set forth in the drawings wherein:

FIG. 1 is a fragmentary sectional view on an enlarged scale, showing the various elements of the control section of a sink faucet.

FIG. 2 is a view similar to FIG. 1 with other elements disclosed and illustrating the water flow.

FIG. 3 is a view at 90 degrees to the views of FIG. 1 and FIG. 2 and likewise in section and fragmentary.

FIG. 4 is a view similar to FIG. 2 showing the water flow in another condition.

FIGS. 5, 6, 7 and 8, correspond to the positions of the various elements shown in the respective FIGS. 1, 2, 3 and 4, with illustrative relationship of water flow and position of control means.

FIG. 9 is a plan view of a seat element used in the construction hereof.

FIG. 10 is a side view of the disclosure of FIG. 9.

FIG. 11 is a sectional view taken about on the line 11—11 of FIG. 9 looking in the direction of the arrows.

FIG. 12 is a sectional view taken about on the line 12—12 of FIG. 9 looking in the direction of the arrows.

FIG. 13 is an enlarged view of a valve spool used in the by-pass valve hereof.

FIG. 14 is a view looking at one end of said valve spool.

FIG. 15 is a view looking at the opposite end of said valve spool.

DETAILED DESCRIPTION OF THE INVENTION

Referring now to FIG. 1, there is shown the central section and control section of a typical sink faucet embodying the invention hereof wherein a body member generally designated 1 is shown and is of substantially cylindrical construction, with the upper end of said body 1, denoted 2 providing a cavity 2a in which is positioned a control member generally designated 3, which in this instance includes a spherical ball 4, to which is attached a portion 5 a handle part in turn engaged with a cover and handle element 6 shown in dotted lines as part of the trim of the faucet.

The control member 4 is provided with a flattened surface 7, which is availed of for regulating waterflow, in conjunction with a diaphragm as shown, which provides a seal 8, the diaphragm following the contour of the ball or sphere 4, and being maintained in position on the cavity portion 2 by a suitable nutlike member 9 which provides the means to maintain the structure in its operating relationship.

This member 9 is threadedly engaged to the upper end of the cavity section 2 and permits the manipulation of the ball or control member 4 as will be readily apparent, this being controlled by a finger 10 which extends into a slot 11 formed in the member 4 to restrict the direction of movement so that the member can be moved fore and aft with that part in engagement with the slot 11. However, this does not inhibit sidewards movement as is illustrated in FIG. 1.

The seal 8 is caused to conform to the member 4 as indicated, and in turn engages a seat unit generally designated 12 which as shown in FIGS. 9 to 12 inclusive, is of disc-like form, and includes a pair of passages 13 and 14 extending therethrough, with the upper ends of the passages being arranged to conform to the spherical shape of the member 4 as indicated particularly in FIG. 11 with the open ends of the passages 13 and 14 being designated 13a and 14a respectively.

Hot and cold water for example, may be supplied to the passages from tubular connections 13b and 14b respectively as shown in FIG. 3.

Another passage through the seat unit 12 is noted at 15, for purposes which will presently appear, the seat unit additionally being provided with the downwardly extending portion 16 which positions the seat in the cavity 2a formed by the portion of the body 2, the seat unit 12 being maintained in position within that cavity by a snap ring 17.

This seat unit 12 is formed by molding and of a suitable plastic such as Celcon, which is proprietory product of General Electric.

The seat unit 12 is arranged so that the passage 15 is in alignment with a passageway 18 formed in the body 1, to permit the flow of fluid in a manner to be subsequently described, to the by-pass unit generally designated 19.

This by-pass unit 19 comprises a tubular body 20, having an enlarged end at 21 on which a seal 22 of o-ring configuration is positioned, the by-pass unit comprising a valve which includes a spool 23 having at one end a shut-off head 24 designated a spray shut-off head, and at the other end a further shut-off head 25 denoted a spout shut-off head connected by the rod-like part 26.

This spool is intended to reciprocate horizontally, to permit fluid from the passage 18, to flow into the same, and as long as the outlet denoted 28 remains open as suggested in FIG. 4, wherein a spray device generally designated 29 is shown connected to the outlet 28 and in open condition.

This spray device 29 as shown is a simple device, diagrammatic primarily in this instance to illustrate the condition wherein the water or fluid mixture passing through the passage 18 into the by-pass unit, and thence through the passage 28 will reach the spray unit 29. Thus when the handle 30 thereof has been manipulated so as to open the spray unit, this will permit fluid to flow outwardly therefrom.

This will in turn be accompanied by a movement of the spool so that the shut-off head 24 thereof is in the position of FIG. 4 permitting the fluid to flow through the outlet 28.

When the spray lever control 30 is closed as by moving upwardly from the position shown in FIG. 4, the fluid will thereupon impinge upon the inside of the spout shut-off head 25 causing the spool to move leftwardly to a position as shown for example in FIG. 2.

Since the body 1 is provided with a gallery 31, which is in the form of a peripheral groove, of substantial extent, extending around the body 1, the water will be directed into this groove, which is enclosed by the cylindrical portion 32 of the spout 33, manufactured so as to provide such an arrangement, the seals 34 and 35 preventing leakage from the gallery 31 at the body these being o-ring seals extending around the said body.

Thus the fluid passing through the passage 18 will be directed to the spout 33 and the outlet thereof as will be readily recognized.

It should be particularly noted that the by-pass valve construction just described, and as to its action described in detail, is arranged in a unique manner since it is horizontal and operating with the spool 23 thereof moving horizontally, the tubular body 20 of this valve 19 being arranged to take up considerably less vertical height and thus to provide a much better arrangement of the respective elements hereof.

The various positions which may be assumed by the respective parts, and illustrated in FIGS. 1 to 4 inclusive as examples, will be noted as comprising in FIG. 1 a position in which the valve and specifically the control member 4 is in closed condition so that the diaphragm 8 will be maintained over the ends 13a and 14a of the passages 13 and 14 as FIG. 5 suggests, the hatched area being the portion of the diaphragm which engages the flat surface 7 of the member 4.

In FIG. 2, the control member 4 has been moved to a fully open position, so that the passages 13 and 14 are both opened as well as the passage 15, and thus fluid is admitted into the interior of the by-pass unit. With the spray unit 29 in closed position, the water will cause the spool 23 to move to the left so that the shut-off head 25 is off of the seat provided in the body 19. This permits the fluid to flow into the gallery 31 previously mentioned and thus outwardly from the outlet provided by the spout 33 in turn.

In FIG. 3, the control member has been adjusted so that only one of the passages 13 in this instance, for example the hot water passage, is permitted to receive fluid, and thus it will pass in the same way as the fluid described in reference to FIG. 2 specifically through the by-pass valve 19, to the gallery 31 and thence to the spout 33 as an outlet therefore.

The passage 14 will be closed as suggested in FIG. 7 by the fact that the hatched area only extends above the passages 13 and 15, indicating the water flow therethrough and thereto.

In FIG. 4, the spray unit 29 has been manipulated by the handle 30, and the flow of water can be directed therethrough. In this instance the spool 23 will have moved to the right so that the head 24 thereof permits the flow of water through the outlet 28 and thus out from the spray head 29.

In this arrangement the spout shut-off head 25 will have moved into closed position, and prevented the delivery of any water to the gallery 31, likewise thereby preventing discharge through the spout 33.

It will be apparent that manipulation of the respective parts will not only provide for tempering of the flow of hot and cold water but also to permit the diversion of the water from the spout to which is normally discharged, to a spray unit 29 upon actuation of the spray handle 30 thereof.

It cannot be emphasized too greatly that the seat construction previously described is very important because it enables the manufacture of a valve of this nature without having to machine the body, but permits the emplacement of a seat of disc-like nature with the various molded passages therein to permit the direction of fluid therethrough in a unique manner.

We claim:

1. In a mixing valve for a single lever faucet wherein the valve has a body formed with an upwardly opening control cavity having a bottom wall, a control member in said cavity having a portion extending therefrom for moving said member, a seal in said cavity engaged by said member, a pair of fluid inlets to the body communicating with said cavity, at least one outlet from the body also communicating with said cavity, said control member comprising a spherical element with a flat portion thereon to manipulate the seal, and the seal comprising a diaphragm conforming to the element; the improvement comprising a removable seat unit positioned in said control cavity to regulate the flow of fluid into and through said body, said seat unit comprising a disc-like part having a pair of inlet passages extending therethrough at positions in alignment with said fluid inlets, and inlet passages terminating at the upper ends thereof in tubular raised portions on the top side of said disc-like part at positions adjacent said diaphragm, said top side of said disc-like part being shaped at said inlet passages to conform to the spherical shape of said element so that said inlet passages can be closed and opened by manipulation of the element to cause the diaphragm to cover and uncover said inlet passages, said top side of said disc-like part around said inlet passages being sufficiently recessed relative said spherical element to provide a mixing chamber which is in continuous fluid communication with said outlet, and a snap-ring releasably mounted on said body and engaged with said top side of said disc-like part so as to maintain said part in engagement with the bottom wall of said cavity.

* * * * *